United States Patent [19]

Mehrgardt et al.

[11] Patent Number: 4,951,127
[45] Date of Patent: Aug. 21, 1990

[54] DIGITAL COLOR-SIGNAL-PROCESSING CIRCUIT THAT PROVIDES INDEPENDENT PROCESSING OF HUE AND SATURATION COMPONENTS IN A COLOR TELEVISION

[75] Inventors: Soenke Mehrgardt, March-Neuershausen; Peter M. Flamm, March, both of Fed. Rep. of Germany

[73] Assignee: Deutsche ITT Industries GmbH, Freiburg, Fed. Rep. of Germany

[21] Appl. No.: 296,092

[22] Filed: Jan. 12, 1989

[30] Foreign Application Priority Data

Jan. 21, 1988 [EP] European Pat. Off. ......... 88 10 0829

[51] Int. Cl.$^5$ ............................................... H04N 9/64
[52] U.S. Cl. .................................................... 358/28
[58] Field of Search ................... 358/28, 24, 27, 29, 358/37, 40, 13

[56] References Cited

U.S. PATENT DOCUMENTS

| | | | |
|---|---|---|---|
| 4,084,178 | 4/1978 | Srivastava | 358/28 |
| 4,352,123 | 9/1982 | Flamm | 358/23 |
| 4,523,221 | 6/1985 | Chin | 358/28 |
| 4,544,944 | 10/1985 | Chin | 358/28 |
| 4,710,892 | 12/1987 | Fling | 358/28 |
| 4,809,059 | 2/1989 | Flamm | 358/2 T |

FOREIGN PATENT DOCUMENTS 112784 6/1984 Japan ..................................... 358/28

OTHER PUBLICATIONS

Jack E. Volder, "The CORDIC Trigonometric Computing Technique", IRE TRANSACTIONS ON ELECTRONIC COMPUTERS, Sep. 1959, pp. 330–334.

Primary Examiner—Tommy P. Chin
Attorney, Agent, or Firm—Thomas L. Peterson

[57] ABSTRACT

A digital color-signal-processing circuit generates a phase-angle signal and a magnitude signal as outputs in response to an R-Y color-difference signal and a B-Y color-difference signal. The circuit includes a resolver which convertes cartesian coordinate representations of the color-difference signals into polar coordinate representations of the phase-angle signal and the magnitude signal. The phase-angle signal carries the hue information, which is processed in a hue stage. The magnitude signal carries the saturation information, which is processed in a saturation stage. The processed phase-angle signal and the processed magnitude signal are reconverted to cartesian coordinate representations of the R-Y and B-Y color-difference signals in a reconverting resolver.

7 Claims, 3 Drawing Sheets

DIGITAL COLOR-SIGNAL-PROCESSING CIRCUIT THAT PROVIDES INDEPENDENT PROCESSING OF HUE AND SATURATION COMPONENTS IN A COLOR TELEVISION

FIELD OF THE INVENTION

The present invention is in the field of digital color signal processing in connection with the reception of color-television signals in accordance with one of the NTSC, SECAM and PAL color-television standards.

BACKGROUND OF THE INVENTION

Digital color-signal-processing circuits are adapted to the color-coding technique used in the NTSC, SECAM, PAL and related color-television standards, such as D2-MAC. This is the usual coding of the chrominance signal by means of the R-Y and B-Y color-difference signals, which precisely specify the location of the respective picture element in the color plane. See, for comparison, the CIE chromaticity diagram according to the German standard DIN 5033. Since the respective luminance value ("Y") is present as the Y signal, saturation, and luminance are unambiguously defined for the respective picture element by these three signals.

As is well known, this coding technique makes it possible to simultaneously transmit the chromaticity information, namely the respective hue and the respective saturation, within the spectrum of the Y signal, thus permitting monochrome reception of the transmitted color picture signal.

In the NTSC and PAL standards, the two color-difference signals are transmitted simultaneously as quadrature-modulated waves using a single chrominance subcarrier whose phase and amplitude are modulated and whose frequency lies in the range of the Y signal.

In the SECAM standard, one of the two color-difference signals is transmitted on one line as a frequency-modulated wave using a first chrominance subcarrier, and the other color-difference signal is transmitted on the next line as a frequency-modulated wave using a second chrominance subcarrier. As in the PAL/NTSC standard, the modulation range of the two chrominance subcarriers lies within the frequency range of the Y signal.

In the D2-MAC standard, the two color-difference signals are transmitted on alternate lines as in the SECAM standard, but at baseband, because, instead of transmitting the chromaticity information within the Y-frequency range using frequency-division multiplexing, a time-division multiplexing method is used in which the chromaticity information and the Y signal are separated in time within a line.

After the R-Y and B-Y color-difference signals have been separated from the composite color signal, e.g., by demodulating the chrominance subcarrier, color-signal processing is performed with the two R-Y and B-Y signals as usual. In digital color-signal-processing systems, these two signals and the Y signal are present as digital data, i.e., digitization takes place before or after the separation; however, this does not form part of the subject matter of the present invention.

The Y signal is fed to a separate Y-processing stage and subsequently combined with the two color-difference signals in a color matrix to generate the values for the red (R), green (G), and blue (B) signals. The dematrixing does not form part of the present invention, either.

Because of the combination of hue and saturation in the two R-Y and B-Y color-difference signals, the processing of these signals affects both components. On the other hand, both signals must be processed, even if only the hue or only the saturation is to be changed.

SUMMARY OF THE INVENTION

In contrast to the foregoing, the object of the present invention is to provide a digital color-signal-processing circuit with which the respective hue and the respective saturation can be separated from one another and then processed independently of each other.

As the signals are processed digitally, much more complex circuits for processing the Y signal and the color signal can be implemented than with analog technology, so that even complicated steps can be taken to improve picture quality. Advantageously, hue and saturation are processed as separate signals. Special filters can suppress color noise or increase the slope of color transients. This filter operation may also be dependent on additional signals, such as a hue control signal.

Furthermore, the number of quantization levels or the processing frequency of the hue can be chosen to be different from that of the saturation because the response of the human eye to sudden hue changes differs from the response to sudden saturation changes.

Further advantages are gained for the storage and processing of the picture data because data-reduction techniques can be adapted to the different requirements for hue and saturation reproduction. This also makes it easier to obtain a flicker-free picture, because data reduction during storage is equivalent to an interpolation of the stored data during reproduction, separately for hue and saturation.

Thus, the fundamental idea of the invention is to change the two R-Y and B-Y color-difference signals into two signals which correspond to the phase angle and the magnitude of the resultant. The change is accomplished by means of a resolver which converts cartesian coordinates corresponding to the two color-difference signals into polar coordinates comprising a magnitude signal and a phase-angle signal. The resulting phase-angle signal is the carrier of the hue information, and the magnitude signal is the carrier of the saturation information. The phase-angle signal and saturation signal are thus processed as separate signals in a hue stage and a saturation stage, respectively.

The transformation of cartesian into polar coordinates requires digital R-Y and B-Y color-difference signals as are provided, for example, at the output of a digital chrominance demodulator, as seen, for example, in U.S. Pat. No. 4,352,123.

BRIEF DESCRIPTION OF THE DRAWINGS

The invention will now be explained in greater detail with reference to the accompanying drawings, in which.

DETAILED DESCRIPTION OF THE PREFERRED EMBODIMENT

Figure 1:
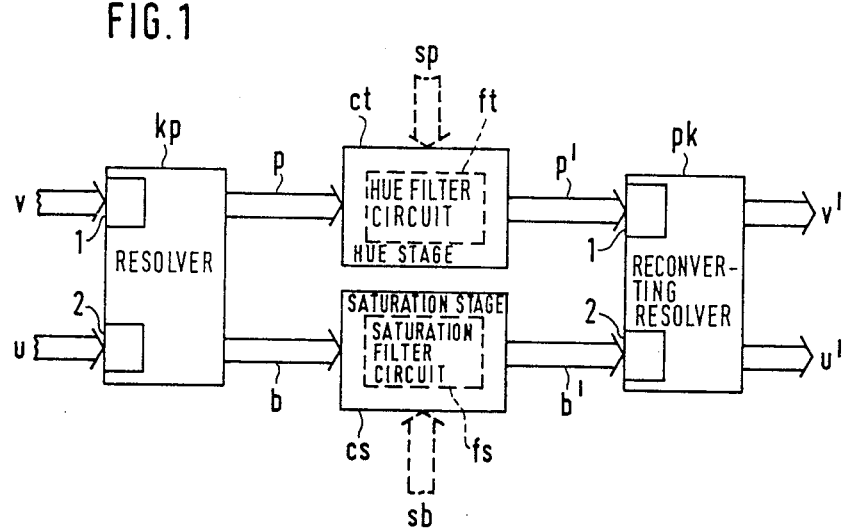
FIG. 1 is a block diagram of an embodiment of the invention.

The block diagram of the embodiment of FIG. 1 shows the R-Y and B-Y color-difference signals v and u, which are applied as digital signals to a first input 1 and a second input 2, respectively, of a resolver kp. The resolver kp assigns the respective data of the input signals to a cartesian coordinate system as data of a resultant within the four quadrants. The magnitude and the phase angle of this resultant are determined, and they appear as outputs of the resolver Kp in digital form as a phase-angle signal p and a magnitude signal b.

The resolver kp can be implemented, for example, by forming the quotient of the R-Y and B-Y color-difference signals and determining the associated tangent value, from which the associated phase angle is obtained via an arc-tangent table. The value of the phase angle is also the digital value of the phase-angle signal p. The ambiguity of the phase-angle formation via the arc tangent is eliminated by applying logical operations to the signs of the two color-difference signals.

The magnitude of the resultant is obtained by forming the sum of the squares of the R-Y and B-Y color-difference signals and then extracting the square root therefrom. This calculation can be easily implemented with suitable computing devices in the resolver kp.

Another realization of the resolver kp is based on a conventional iterative process which requires only additions and subtractions in addition to a single multiplication. Depending on the number of iterative steps, any degree of accuracy is attainable. Thus, a circuit arrangement using this method is especially suited for fast coordinate transformation, because it contains neither dividers nor square-root extractors. This method is described as the "CORDIC method" by Jack E. Volder in "The CORDIC Trigonometric Computing Technique," *IRE TRANSACTIONS ON ELECTRONIC COMPUTERS*, September 1959, pages 333 and 334, where the arithmetic circuits are shown in a block diagram.

In FIG. 1, the phase-angle signal p is fed to a hue stage ct, which may contain a hue filter circuit ft. The hue filter circuit ft increases the slope of color transients by emphasizing particular frequencies while reducing the magnitude of other frequencies which tend to represent color noise. The hue stage ct can be controlled by means of a hue control signal sp, which is fed to the hue stage ct via a data line shown by broken lines.

If the hue stage ct is used for flesh-tone correction, color values near the flesh hue are to be corrected toward this fixed hue value. This is particularly important where color-television signals are processed in accordance with the NTSC color-television standard because phase errors caused during transmission of an NTSC signal change the hue, which is particularly disturbing in the case of flesh-tone colors. Flesh-tone correction is achieved with the digital signal-processing circuit according to the invention by passing the phase-angle signal p within the hue stage ct through a nonlinear element which compresses signals in the range of the flesh hue within a narrower range of values.

In FIG. 1, the magnitude signal b is fed to a saturation stage cs, which may contain a saturation filter circuit fs. By means of a external saturation control signal sb, saturation may also be controlled from other subcircuits, such as an ambient-light sensor or a manual remote control unit.

The output of the hue stage ct is a modified phase-angle signal p', which is applied to a first input 1 of a reconverting resolver pk. A second input 2 of the reconverting resolver pk is fed with a modified magnitude signal b', namely the output signal from the saturation stage cs. The reconverting resolver pk converts the polar coordinates back into the cartesian coordinates of the color vector and derives therefrom a modified R-Y color-difference signal v' and a modified B-Y color-difference signal u'.

The further processing of these signals is not shown in FIG. 1. The signals are fed, together with the Y signal, to the color matrix, which generates the R, G, and B signals. Since an analog color matrix is particularly simple in design, and since the driving of the three color cathodes of the color-picture tube requires analog signals, the signals may be converted back to analog form before being applied to the color matrix.

Figure 8:
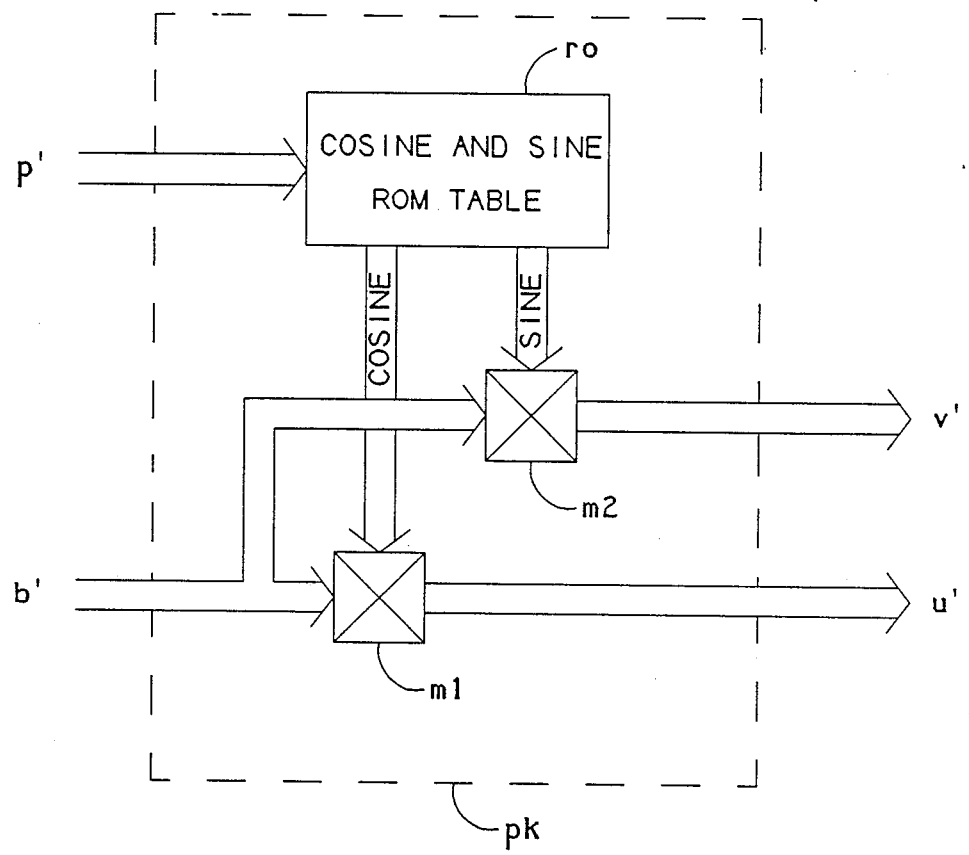
FIG. 8 is a block diagram of a preferred embodiment of the reconverting resolver of FIG. 1 showing the ROM and the multipliers.

As shown in FIG. 8, the reconverting resolver pk contains, for example, a cosine and sine ROM table which is stored in a read-only memory and whose addresses are all values of the modified phase-angle signal p'. The associated cosine and sine values are multiplied by the values of the modified magnitude signal b' by respective multipliers m1 and m2. The values of the cartesian coordinates of the color vector are thus determined by the phase-angle and the magnitude signal inputs. The modified B-Y color-difference signal u' and the modified R-Y color difference signal v' are assigned to the cosine value and the sine value, respectively.

Figure 2:
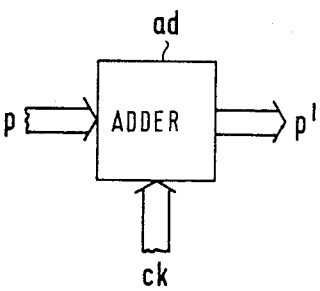
FIG. 2 is a block diagram of an embodiment of the hue stage.

FIG. 2 shows schematically another, simple embodiment of the hue stage ct. The stage is formed by an adder ad, to which the phase-angle signal p and a hue-control or hue-correction signal ck are applied. The sum signal output of the adder ad is the modified phase-angle signal p'. The hue-control or hue-correction signal ck is, for example, the hue-control signal sp of FIG. 1, which is fed to the hue stage ct from other subcircuits. The hue-control signal sp may be a signal from an ambient-light sensor or a remote control receiver circuit, for example, but it may also consist of temporarily stored data from an automatic alignment routine or a previous service adjustment.

Figure 3:
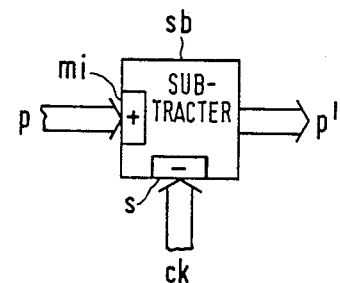
FIG. 3 is a block diagram of an alternative embodiment of the hue stage.

FIG. 3 shows another embodiment of the hue stage ct, which comprises a subtracter sb. The phase-angle signal p is applied to a minuend input mi of the subtracter sb, and the hue-control or hue-correction signal ck is applied to a subtrahend input s of the subtracter sb. The output of the subtracter sb is the modified phase-angle signal p'. The hue stages of FIGS. 2 and 3 thus closely resemble each other in construction and operation.

Figure 4:
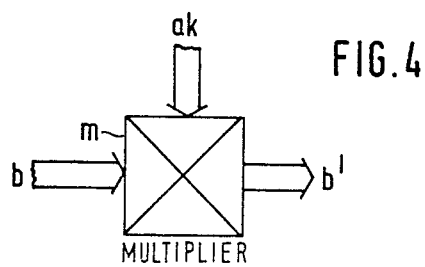
FIG. 4 is a block diagram of an embodiment of the saturation stage.

FIG. 4 shows a simple embodiment of the saturation stage cs. It is formed by a multiplier m, to which the magnitude signal b and a magnitude correction factor ak are fed. In the multiplier m, the data of these two signals are multiplied together to obtain the modified magnitude signal b'. In this case, the saturation stage cs represents a variable-gain amplifier for the magnitude signal b and, thus, for the saturation. The magnitude correction factor ak controls the gain or attenuation and may also be identical with the saturation control signal sb of FIG. 1.

Figure 5:
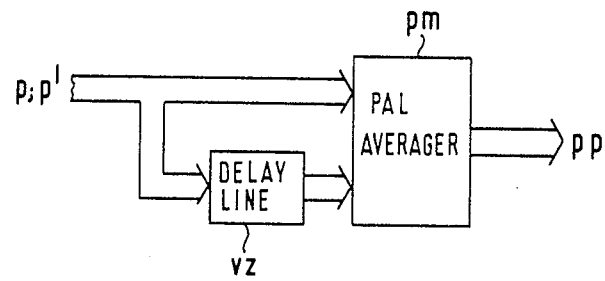
FIG. 5 is a block diagram of an embodiment of the PAL compensation.

FIG. 5 shows schematically how simple the PAL line compensation is. In the PAL standard, the R-Y color-difference signal is transmitted with the phase alternating from line to line, namely with +90° or −90°. In the conventional PAL compensation, a resultant color vector is formed from the values of the two color-difference signals of two successive lines by adding the R-Y color-difference signal to the properly signed R-Y color-difference signal delayed by one line and by adding the B-Y color-difference signal to the B-Y color-difference signal delayed by one line. Phase errors caused on the transmission path are thus largely compensated for, but a clear desaturation effect of the colors sets in at a phase error of 40°. This is avoided in the PAL compensation shown in FIG. 5. The unmodified phase-angle signal p and the modified phase-angle signal p' are directly applied to a first input of a PAL averager pm and applied to a second input of the PAL averager pm through a delay line vz, which provides a delay equal to the duration of one scanning line. The PAL averager pm is a modified adder which forms the sum of the two input signals and divides it by two, which is equivalent to a simple shift by one position in the straight binary code. The output is the compensated phase-angle signal pp.

In the circuit arrangement of FIG. 5, no reduction of the magnitude signal and, consequently, no desaturation take place. This is a particular advantage of the circuit arrangement of FIG. 5. Another advantage of the circuit arrangement of FIG. 5 is that, unlike in the conventional methods, only a single signal, namely the phase-angle signal p or p', needs to be delayed by one line period, and not two signals, namely the two color-difference signals. This has an added advantage in that the two phase-angle signals p and p' are band-limited as pure hue signals to about 1–2 MHz, so that the clock frequency at which they are processed can be correspondingly low.

The PAL compensation circuit of FIG. 5 is inserted, for example, between the resolver kp and the hue stage ct if signals conforming to the PAL color-television standard have to be processed.

Figures 6, 7:
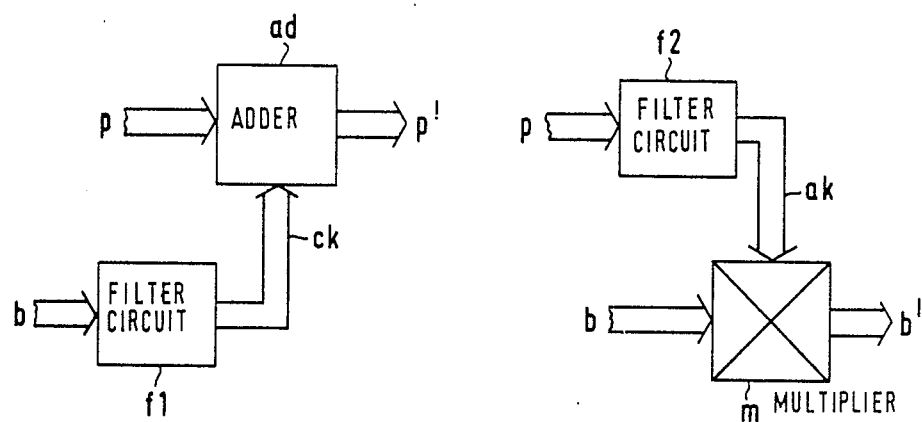
FIG. 6 is a block diagram of an embodiment of the hue stage of FIG. 2 in which the phase-angle signal can be varied by means of the magnitude signal.
FIG. 7 is a block diagram of an embodiment in which the magnitude signal can be varied by means of the phase-angle signal.

FIG. 6 is a specific embodiment of the circuit arrangement of FIG. 2. The hue-control or hue-correction signal ck is derived from the magnitude signal b by means of a first filter circuit f1. With this arrangement, the slope of color transients can be increased as a function of the magnitude signal b.

FIG. 7 shows a similar circuit arrangement in which the action of the magnitude signal b is controlled by the phase-angle signal p via a second filter circuit f2. By combining the magnitude signal b with the phase-angle signal p, arbitrary deformations of the hue circle are possible. This can be used for matrixing, for example. Furthermore, arbitrary increases or reductions of the saturation of particular hue ranges are possible.

The phase-angle signal p can also be used to advantage for the chrominance-subcarrier phase-locked loop ("chrominance-subcarrier PLL"), which serves to demodulate the chrominance subcarrier in the NTSC and PAL standards. To this end, the chrominance subcarrier PLL must be phase-locked to the transmitted reference phase of the chrominance subcarrier or to any other reference-phase system. This use is possible because the phase-angle signal p is completely independent of the amplitude of the received composite-color signal and can therefore be obtained from the automatic color control ("ACC"). This is advantageous for the phase control.

What is claimed is:

1. A digital color-signal-processing circuit for a color television receiver, said circuit receiving color information as a R-Y color-difference signal and a B-Y color-difference signal, said circuit comprising:
   a resolver that receives said R-Y color-difference signal and said B-Y color difference signal as a pair of cartesian coordinates and converts said pair of cartesian coordinates into polar coordinates comprising a phase-angle signal and a magnitude signal;
   a hue stage that receives said phase-angle signal and generates a modified phase-angle signal, said hue stage comprising an adder having a first input, a second input and an output, said first input of said adder receiving said phase-angle signal output of said resolver, said second input receiving a hue-control or hue-correction signal, said output providing a modified phase-angle signal;
   a saturation stage that receives said magnitude signal and generates a modified magnitude signal; and
   a first filter circuit having an input and an output, said input receiving said magnitude signal output of said resolver, said output providing said hue-control or hue-correction signal.

2. A digital color-signal-processing circuit for a color television receiver, said circuit receiving color information as a R-Y color-difference signal and a B-Y color-difference signal, said circuit comprising:
   a resolver that receives said R-Y color-difference signal and said B-Y color difference signal as a pair of cartesian coordinates and converts said pair of cartesian coordinates into polar coordinates comprising a phase-angle signal and a magnitude signal;
   a hue stage that receives said phase-angle signal and generates a modified phase-angle signal, said hue stage comprising an adder having a first input, a second input and an output, said first input of said adder receiving said phase-angle signal output of said resolver, said second input receiving a hue-control or hue-correction signal, said output providing a modified phase-angle signal;
   a saturation stage that receives said magnitude signal and generates a modified magnitude signal, said saturation stage comprising a multiplier having first and second inputs and an output, said first input receiving said magnitude signal, said second input receiving a magnitude correction factor, said output providing said modified magnitude signal;
   a first filter circuit having an input and an output, said input receiving said magnitude signal output of said resolver, said output providing said hue-control or hue-correction signal; and
   a second filter circuit having an input and an output, said input receiving said phase-angle signal output of said resolver, said output providing said magnitude correction factor to said saturation stage.

3. A digital color-signal-processing circuit for a color television receiver, said circuit receiving color information as a R-Y color-difference signal and a B-Y color-difference signal, said circuit comprising:
   a resolver that receives said R-Y color-difference signal and said B-Y color difference signal as a pair of cartesian coordinates and converts said pair of cartesian coordinates into polar coordinates comprising a phase-angle signal and a magnitude signal;

a hue stage that receives said phase-angle signal and generates a modified phase-angle signal;

a saturation stage that receives said magnitude signal and generates a modified magnitude signal, said saturation stage comprising a multiplier having first and second inputs and an output, said first input receiving said magnitude signal, said second input receiving a magnitude correction factor, said output providing said modified magnitude signal; and a filter circuit having an input and an output, said input receiving said phase-angle signal output of said resolver, said output providing said magnitude correction factor to said saturation stage.

4. The digital color-signal-processing circuit as defined in claim 1, further comprising a reconverting resolver having first and second inputs and first and second outputs, said first input receiving said modified phase-angle signal, said second input receiving said modified magnitude signal, said modified phase-angle signal and said modified magnitude signal being provided as polar coordinate inputs to said reconverting resolver, said first output providing a modified R-Y color-difference signal and said second output providing a modified B-Y color-difference signal, said modified R-Y color-difference signal and said modified B-Y color-difference signal corresponding to cartesian coordinates derived from said polar coordinate inputs to said reconverting resolver.

5. A digital-color-signal processing circuit for a color television receiver operating in accordance with the PAL color-television standard, said circuit receiving color information as a R-Y color-difference signal and a B-Y color-difference signal, said circuit comprising:

a resolver that receives said R-Y color-difference signal and said B-Y color difference signal as a pair of cartesian coordinates and converts said pair of cartesian coordinates into polar coordinates comprising a phase-angle signal and a magnitude signal;

a hue stage that receives said phase-angle signal and generates a modified phase-angle signal;

a saturation stage that receives said magnitude signal and generates a modified magnitude signal;

a delay line having an input and an output, said input receiving an input phase-angle signal from said resolver, said output providing a delayed phase-angle signal that is delayed from said input phase-angle signal by the duration of one scanning line; and a PAL averager having first and second inputs and an output, said first input receiving said phase-angle signal from said resolver, said second input receiving said delayed phase-angle signal from said delay line, said output providing a compensated phase-angle signal that is the average of said phase-angle signal received by said first input and said delayed phase-angle signal received by said second input.

6. A digital-color-signal-processing circuit for a color television receiver operating in accordance with the PAL color-television standard, said circuit receiving color information as a R-Y color-difference signal and a B-Y color-difference signal, said circuit comprising:

a resolver that receives said R-Y color-difference signal and said B-Y color difference signal as a pair of cartesian coordinates and converts said pair of cartesian coordinates into polar coordinates comprising a phase-angle signal and a magnitude signal;

a hue stage that receives said phase-angle signal and generates a modified phase-angle signal;

a saturation stage that receives said magnitude signal and generates a modified magnitude signal;

a delay line having an input and an output, said input receiving a modified phase-angle signal from said hue stage, said output providing a delayed phase-angle signal that is delayed from said modified phase-angle signal by the duration of one scanning line; and a PAL averager having first and second inputs and an output, said first input receiving said modified phase-angle signal from said hue stage, said second input receiving said delayed phase-angle signal from said delay line, said output providing a compensated phase-angle signal that is the average of said modified phase-angle signal received by said first input and said delayed phase-angle signal received by said second input.

7. A digital-color-signal-processing circuit said circuit receiving color information as a R-Y color-difference signal and a B-Y color-difference signal, said circuit comprising:

a resolver that receives said R-Y color-difference signal and said B-Y color difference signal as a pair of cartesian coordinates and converts said pair of cartesian coordinates into polar coordinates comprising a phase-angle signal and a magnitude signal;

a hue stage that receives said phase-angle signal and generates a modified phase-angle signal;

a saturation stage that receives said magnitude signal and generates a modified magnitude signal;

a reconverting resolver having first and second inputs and first and second outputs, said first input receiving said modified phase-angle signal, said second input receiving said modified magnitude signal, said modified phase-angle signal and said modified magnitude signal being provided as polar coordinate inputs to said reconverting resolver, said first output providing a modified R-Y color-difference signal and said second output providing a modified B-Y color-difference signal, said modified R-Y color-difference signal and said modified B-Y color-difference signal corresponding to cartesian coordinates derived from said polar coordinate inputs to said reconverting resolver, said reconverting resolver comprising a circuit arrangement that includes a ROM table, said ROM table addressed by said modified phase-angle signal, said ROM table providing cosine and sine values of said modified phase-angle signal which are multiplied by the value of the modified magnitude signal to generate said modified B-Y color-difference signal and said modified R-Y color difference signal.

* * * * *